(12) United States Patent
MacDougall (10) Patent No.: US 8,425,239 B2
(45) Date of Patent: Apr. 23, 2013

(54) ELECTRICAL CONNECTOR FOR A SOLAR MODULE ASSEMBLY

(75) Inventor: Alan R. MacDougall, Beaverton, OR (US)

(73) Assignee: Tyco Electronics Corporation, Berwyn, PA (US)

( * ) Notice: Subject to any disclaimer, the term of this patent is extended or adjusted under 35 U.S.C. 154(b) by 414 days.

(21) Appl. No.: 12/500,328

(22) Filed: Jul. 9, 2009

(65) Prior Publication Data

US 2011/0008978 A1    Jan. 13, 2011

(51) Int. Cl.
*H01R 12/00* (2006.01)

(52) U.S. Cl.
USPC ............................................................ 439/83

(58) Field of Classification Search .............. 439/83, 439/879, 891, 886, 883
See application file for complete search history.

(56) References Cited

U.S. PATENT DOCUMENTS

| | | |
|---|---|---|
| 5,052,954 A | 10/1991 | Seidler |
| 5,232,377 A | 8/1993 | Leibfried |
| 5,281,167 A | 1/1994 | Le et al. |
| 5,875,546 A | 3/1999 | Cachina et al. |
| 6,099,365 A | 8/2000 | Cachina et al. |
| 6,179,631 B1 | 1/2001 | Downes et al. |
| 6,402,574 B2 | 6/2002 | Cachina et al. |
| 6,494,754 B2 | 12/2002 | Cachina et al. |
| 6,543,129 B2 | 4/2003 | Cachina et al. |
| 6,955,545 B1 * | 10/2005 | Morana et al. ................. 439/83 |
| 7,347,750 B2 | 3/2008 | Cachina et al. |
| 7,371,083 B2 * | 5/2008 | Pereira et al. ................. 439/83 |
| 2008/0108255 A1 | 5/2008 | Peloza et al. |

* cited by examiner

*Primary Examiner* — Felix O Figueroa (57) ABSTRACT

An electrical connector includes a housing, a contact terminal and a preformed solder body. The housing is configured to be mounted to an exterior surface of a photovoltaic module. The contact terminal is joined to the connector housing and has a connection surface and a fixation opening that extends through the contact terminal. The preformed solder body is applied to the connection surface of the contact terminal and includes a fixation tab. The preformed solder body provides an electrically conductive connection between the contact terminal and a conductive contact extending out of the exterior surface of the photovoltaic module to electrically couple the contact terminal and the photovoltaic module. The fixation tab of the preformed solder body engages the fixation opening of the contact terminal to secure the preformed solder body to the contact terminal.

22 Claims, 5 Drawing Sheets

ELECTRICAL CONNECTOR FOR A SOLAR MODULE ASSEMBLY

BACKGROUND OF THE INVENTION

The subject matter herein relates generally to electrical connectors and, more particularly, for electrical connectors that are mounted to photovoltaic or solar modules.

Solar modules or panels convert incident light into electricity. Known solar modules receive light and convert the light into an electrical potential difference. The electrical potential difference is applied to module contacts positioned at or near an exterior surface of the solar module. An electrical connector is electrically coupled to the module contacts to receive the potential difference. The potential differences of the solar modules may be combined as an electric current passing through several of the connectors and modules. The electric current may then be applied to an electric load that uses the current generated by the solar modules to perform one or more operations or actions.

Some known electrical connectors are mounted to the solar modules to electrically couple the connectors with the solar modules. The connectors may be referred to as solar junction boxes. A bus bar ribbon or other contact may extend from the solar module and be affixed to contacts in the connectors. Some known connectors affix the bus bar ribbons to the contacts using solder. For example, solder balls may be applied to the contacts between the contacts and the bus bar ribbon. The solder balls are then heated to reflow the solder to secure the contacts and bus bar with one another and to provide an electrically communicative pathway between the contacts and the bus bar.

The solder that is used in some known connectors is manually applied. The manual application of the solder may result in inefficient use of the solder. For example, the manual application of the solder may cause a wide variance in the amounts of solder that are applied to the contacts. Some contacts may have too little solder and thus have a relatively poor electrical connection with the solar module. Other contacts may have too much solder, thereby resulting in wasted solder material.

Therefore, a need exists for connectors that use solder more efficiently to electrically couple the connectors with, for example, photovoltaic modules.

BRIEF DESCRIPTION OF THE INVENTION

In one embodiment, an electrical connector is provided. The connector includes a housing, a contact terminal and a preformed solder body. The housing is configured to be mounted to an exterior surface of a photovoltaic module. The contact terminal is joined to the connector housing and has a connection surface and a fixation opening that extends through the contact terminal. The preformed solder body is applied to the connection surface of the contact terminal and includes a fixation tab. The preformed solder body provides an electrically conductive connection between the contact terminal and a conductive contact extending out of the exterior surface of the photovoltaic module to electrically couple the contact terminal and the photovoltaic module. The fixation tab of the preformed solder body engages the fixation opening of the contact terminal to secure the preformed solder body to the contact terminal.

In another embodiment, another electrical connector is provided. The connector includes a housing and a contact terminal. The housing is configured to be mounted to an exterior surface of a photovoltaic module. The contact terminal is joined to the connector housing and includes a connection surface and a fixation opening that extends through the contact terminal. The connection surface receives a preformed solder body to establish an electrically conductive connection between the contact terminal and a conductive contact extending out of the photovoltaic module to electrically couple the contact terminal and the photovoltaic module. The fixation opening receives a fixation tab of the preformed solder body when the preformed soldered body is crimped to the contact terminal to secure the preformed solder body to the contact terminal.

DETAILED DESCRIPTION OF THE INVENTION

Figure 1:
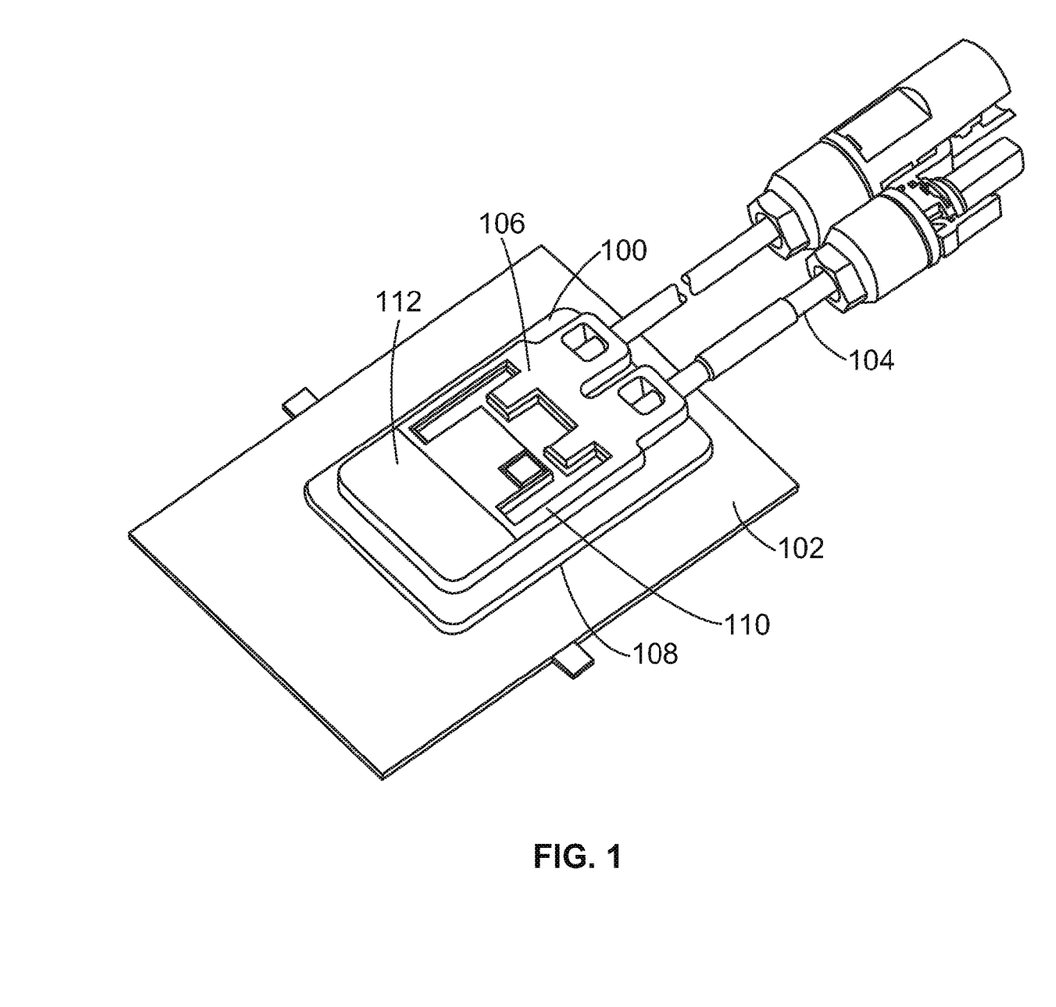
FIG. 1 is a perspective view of an electrical connector in accordance with one embodiment of the presently described invention.

FIG. 1 is a perspective view of an electrical connector 100 in accordance with one embodiment of the presently described invention. The connector 100 is illustrated as a junction box connector for a photovoltaic panel or module, but one or more embodiments described herein may be applicable to connectors that are used with devices other than photovoltaic devices. The connector 100 is mounted to and electrically coupled with a photovoltaic module 102. For example, in the illustrated embodiment, the connector 100 includes a housing 106 that extends between a mounting side 108 and an opposite side 110. The mounting side 108 is mounted to an exterior surface of the photovoltaic module 102. The housing 106 includes a cover 112 that encloses the contact terminals 202 (shown in FIG. 2) within the housing 106. The contact terminals 202 are electrically coupled with the photovoltaic module 102.

Light that is incident on one or more of the opposite sides 110 of the photovoltaic module 102 is converted into electricity. The electricity generated by the photovoltaic module 102 flows to the connector 100. The photovoltaic module 102 may include an opening 602 (shown in FIG. 6) through which one or more photovoltaic contacts 600 (shown in FIG. 6) extend. The connector 100 includes a contact window 200 (shown in FIG. 2) that is an opening extending through the connector 100 and is disposed above the opening 602. Contact terminals 202 (shown in FIG. 2) of the connector 100 protrude into the contact window 200 to mate with the contact terminals 202. The connector 100 includes cables 104 that are electrically joined with the contact terminals 202 and that couple the connector 100 with another connector (not shown) and/or an external load (not shown). The photovoltaic contacts 600, contact terminals 202, and cables 104 transmit electric current generated in the photovoltaic module 102 to the other connector or external load.

Figure 2:
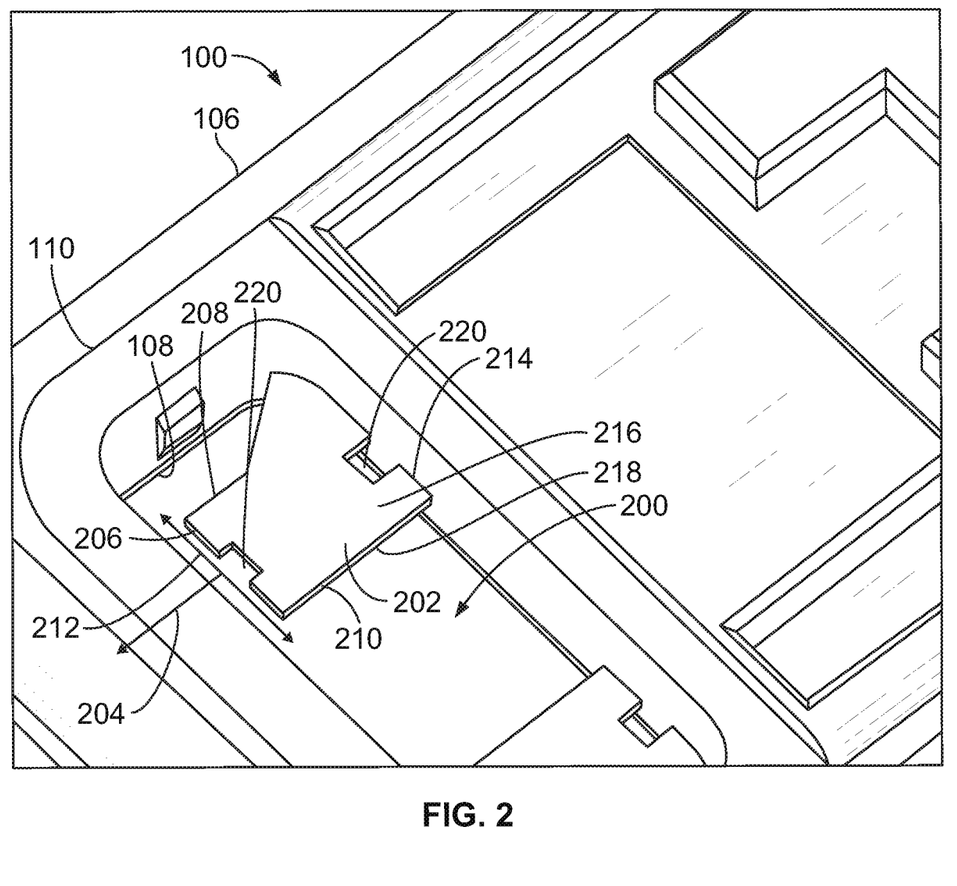
FIG. 2 is a partial perspective view of the connector shown in FIG. 1 in accordance with one embodiment of the presently described invention.

FIG. 2 is a partial perspective view of the connector 100 in accordance with one embodiment of the presently described invention. The housing 106 is shown in FIG. 2 with the cover 112 (shown in FIG. 1) removed. The housing 106 of the connector 100 includes the contact window 200 that extends through the housing 106 from the mounting side 108 to the opposite side 110. In the illustrated embodiment, the contact terminals 202 are joined to the housing 106 and extend from the housing 106 into the contact window 200. Alternatively, a different number of contact terminals 202 may be provided. The contact terminals 202 protrude from the housing 106 along an extension direction 204. In the illustrated embodiment, the extension direction 204 is oriented substantially parallel to the mounting side 108 and opposite side 110 of the housing 106. The contact terminals 202 are electrically joined with the cables 104 (shown in FIG. 1) and the photovoltaic module 102 (shown in FIG. 1) to convey electric current generated in the photovoltaic module 102 to another connector (not shown) and/or external electric load (not shown).

The contact terminals 202 include, or are formed from, a conductive material, such as a metal or metal alloy. In the illustrated embodiment, the contact terminals 202 are planar bodies formed of a conductive material. The contact terminals 202 extend from the housing 106 to an outer peripheral edge 206 along the extension direction 204 and extend between opposite side peripheral edges 208, 210 along a lateral axis 212. The lateral axis 212 is oriented approximately perpendicular to the extension direction 204 and may be oriented substantially parallel to the mounting side 108 and the opposite side 110 of the housing 106. The contact terminals 202 include an inner peripheral edge 214 that represents the interface between the contact terminals 202 and the housing 106. The inner and outer peripheral edges 214, 206 are disposed opposite one another. The peripheral edges 206, 208, 210, 214 define the outer perimeter of the portions of the contact terminals 202 that extend out of the housing 106 in the illustrated embodiment.

The contact terminals 202 include a connection surface 216 and an opposite surface 218. The surfaces 216, 218 may be substantially planar surfaces on opposite sides of the contact terminals 202. As shown in FIG. 2, the connection surface 216 is disposed on top of the planar body of the contact terminal 202 while the opposite surface 218 is located below the planar body of the contact terminal 202 and opposes, or faces, the exterior surface of the photovoltaic module 102 (shown in FIG. 1). Alternatively, the surfaces 216, 218 may be switched with the connection surface 216 disposed below the opposite surface 218. In the illustrated embodiment, each of the contact terminals 202 includes two fixation openings 220 that extend through the contact terminals 202 from the connection surface 216 to the opposite surface 218. The fixation openings 220 provide structure for a preformed solder body 300 (shown in FIG. 3) to couple with in order to secure the preformed solder body 300 with the contact terminal 202.

The fixation openings 220 may be slots that extend inward from the inner edge 214 and the outer edge 206. The fixation openings 220 inwardly extend from the edges 206, 214 without extending the entire way through the contact terminals 202 from one edge 206 to the other edge 214. The fixation openings 220 shown in FIG. 2 are linearly aligned with respect to one another along the extension direction 204. For example, the fixation openings 220 may be approximately centered on the extension direction 204. Alternatively, the fixation openings 220 may be linearly aligned with one another along a direction that is angled with respect to the extension direction 204. For example, the Fixation openings 220 may be approximately centered on a line that is parallel to the lateral axis 212. In another embodiment, the fixation openings 220 may have different shapes and/or dimensions. Alternatively, the fixation openings 220 may be provided in a location other than at a peripheral edge 206, 208, 210, 214 of the contact terminal 202. For example, the fixation openings 220 may be a hole that extends through the contact terminal 202 and is disposed between the opposite edges 206, 214 and between the edges 208, 210.

Figure 3:
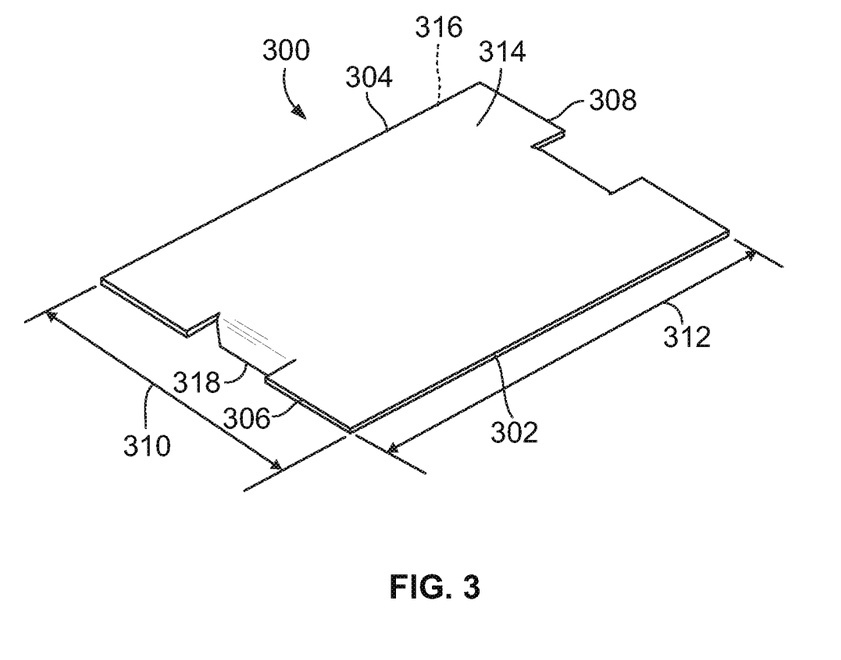
FIG. 3 is a perspective view of a preformed solder body in accordance with one embodiment of the presently described invention.
Figure 4:
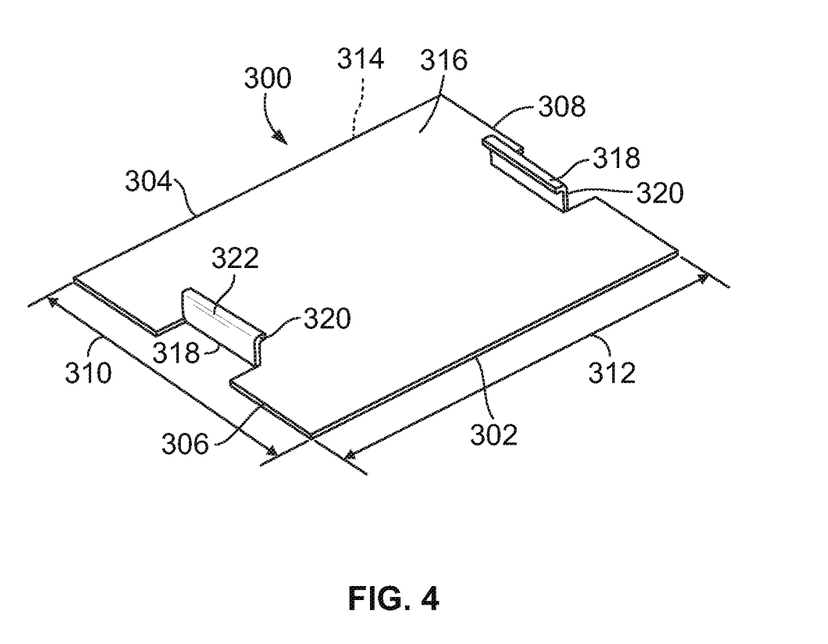
FIG. 4 is another perspective view of the preformed solder body shown in FIG. 3 in accordance with one embodiment of the presently described invention.

FIG. 3 illustrates a perspective view of the preformed solder body 300 in accordance with one embodiment of the presently described invention. FIG. 4 illustrates another perspective view of the preformed solder body 300 in accordance with one embodiment of the presently described invention. The preformed solder body 300 is a body formed of a conductive solder that has a predetermined shape prior to applying the preformed solder body 300 to the contact terminals 202 (shown in FIG. 2) and reflowing the preformed solder body 300. In one embodiment, the preformed solder body 300 may be formed from SAC 305 solder from Alpha Metals. Alternatively, the preformed solder body 300 may be formed from a different solder alloy. In one embodiment, the preformed solder body 300 includes a flux material to improve the extent to which the preformed solder body 300 wets the contact terminals 202 and/or the photovoltaic contact 600 (shown in FIG. 6).

The preformed solder body 300 is applied to the connection surface 216 (shown in FIG. 2) of a contact terminal 202 to electrically couple the contact terminal 202 with the photovoltaic module 102 (shown in FIG. 1). For example, the preformed solder body 300 may be placed onto the connection surface 216 (shown in FIG. 2) of the contact terminal 202 prior to placing the photovoltaic contact 600 (shown in FIG. 6) of the photovoltaic module 102 onto the preformed solder body 300. Heat may be applied to the preformed solder body 300 to cause the preformed solder body 300 to flow and wet both the contact terminal 202 and the photovoltaic contact 600 before solidifying to form an electrically conductive pathway between the contact terminal 202 and the photovoltaic contact 600. As described below, in one embodiment the photovoltaic contact 600 is a buss bar conductor that electrically couples the photovoltaic module 102 with the contact terminals 202.

In the illustrated embodiment, the preformed solder body 300 is a substantially planar body that extends between opposite outer edges 302, 304 and between opposite outer edges 306, 308. The edges 302, 304 may be approximately parallel to one another and the edges 306, 308 may be approximately parallel to one another such that the body 300 has a square or rectangular shape. The preformed solder body 300 may have approximately the same thickness between opposite sides 314, 316 of the preformed solder body 300 across substantially all of the preformed solder body 300. For example, the preformed solder body 300 may have a thickness dimension that is measured in a direction perpendicular to the sides 314, 316 that is approximately the same throughout the body 300 between the edges 302, 304 and between the edges 306, 308. Alternatively, the preformed solder body 300 may have a different shape and/or different dimensions.

The preformed solder body 300 may be approximately the same size as the connection surface 216 (shown in FIG. 2) of the contact terminal 202 (shown in FIG. 2). For example, a width dimension 310 of the preformed solder body 300 that extends from the edge 302 to the edge 304 may be approximately the same as the distance between the peripheral edges 208, 210 (shown in FIG. 2) of the contact terminal 202 in a direction parallel to the lateral axis 212 (shown in FIG. 2). A length dimension 312 of the preformed solder body 300 that extends from the edge 306 to the edge 308 may be approximately the same as the distance between the peripheral edges 206, 214 (shown in FIG. 2) of the contact terminal 202 in a direction parallel to the extension direction 204 (shown in FIG. 2).

The preformed solder body 300 includes fixation tabs 318 that are bent out of the plane defined by the preformed solder body 300. In another embodiment, a different number of fixation tabs 318 are provided. For example, the fixation tabs 318 may include portions of the preformed solder body 300 that are bent at an angle with respect to the sides 314, 316 of the preformed solder body 300. The fixation tabs 318 are disposed along the opposite edges 306, 308. Alternatively, the fixation tabs 318 may be located along the edges 302, 304 or along adjacent or intersecting ones of the edges 302-308. For example, the fixation tabs 318 may be disposed along the edges 302, 308. In another embodiment, the fixation tabs 318 may be provided as a portion of the preformed solder body 300 that extends from the side 316 and is located in the interior of the body 300 between the edges 302, 304 and between the edges 306, 308. For example, a fixation tab 318 may be provided as a protrusion that extends from the side 316 in a direction away from the side 316.

In the illustrated embodiment, the fixation tabs 318 include latch protrusions 320 that extend from outer ends 322 of the fixation tabs 318 at an angle with respect to the fixation tabs 318. For example, the latch protrusions 320 may include portions of the fixation tabs 318 at the outer ends 322 of the tabs 318 that are oriented at an angle with the remainder of the tabs 318.

Figure 5:
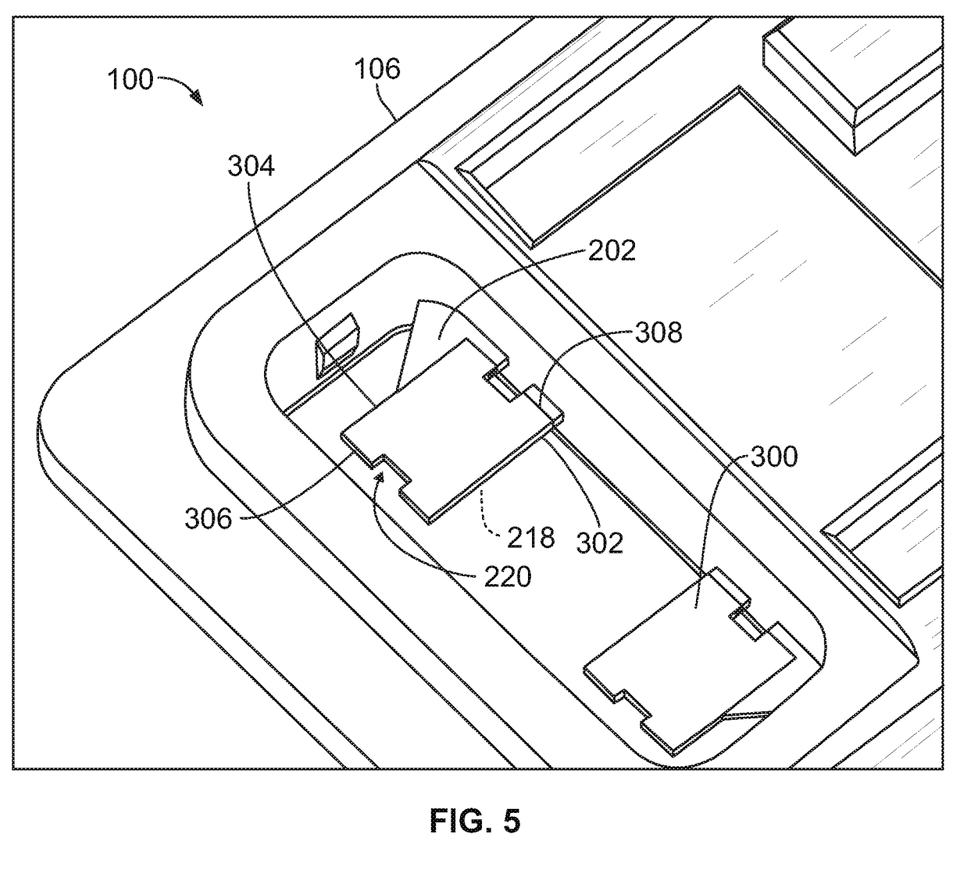
FIG. 5 is another partial perspective view of the connector shown in FIG. 1 in accordance with one embodiment of the presently described invent ion.

FIG. 5 is another partial perspective view of the connector 100 in accordance with one embodiment of the presently described invention. The housing 106 is shown in FIG. 5 with the cover 112 (shown in FIG. 1) removed. The preformed solder bodies 300 are applied to the contact terminals 202. For example, the preformed solder bodies 300 may be placed on the connection surfaces 216 (shown in FIG. 2) of the contact terminals 202. Alternatively, the preformed solder bodies 300 may be applied to the opposite surface 218 (shown in FIG. 2) of the contact terminals 202. The preformed solder bodies 300 may be deposited onto the contact terminals 202 prior to heating and/or reflowing the preformed solder bodies 300. In one embodiment, the preformed solder bodies 300 are applied to the contact terminals 202 in an automated process. For example, several preformed solder bodies 300 may be disposed on a tape or reel (not shown) that is moved relative to the contact terminals 202. The preformed solder bodies 300 may be placed onto the contact terminals 202 from the tape or reel as the contact terminals 202 move relative to the tape or reel. The preformed solder bodies 300 may be formed from a solder ribbon and placed on the contact terminals 202 in an inline assembly process.

The preformed solder body 300 extends over a majority of the connection surface 216 (shown in FIG. 2) of the contact terminal 202. For example, the preformed solder body 300 may cover substantially all or the entire connection surface 216, as shown in FIG. 5. Alternatively, the preformed solder body 300 may cover a different portion or area of the connection surface 216. The size, shape and/or dimensions of the preformed solder bodies 300 may ensure that an approximately equivalent amount of solder is applied to each contact terminal 202 in the connector 100. Additionally, the preformed solder bodies 300 may ensure that approximately the same amount of solder is applied to the contact terminals 202 among several connectors 100.

In one embodiment, the preformed solder bodies 300 are secured to the contact terminals 202 to retain the preformed solder bodies 300 to the contact terminals 202 prior to heating and reflowing the preformed solder bodies 300. For example, the fixation tabs 318 (shown in FIG. 3) of the preformed solder bodies 300 may be bent into the fixation openings 220 of the contact terminals 202. The fixation tabs 318 may be bent downward into the fixation openings 220 and crimped against the contact terminals 202. By way of example only, the fixation tabs 318 may be bent through the fixation openings 220 and onto the opposite surface 218 of the contact terminal 202 to crimp the preformed solder body 300 onto the contact terminal 202. The latch protrusions 320 (shown in FIG. 3) of the fixation tabs 318 may engage the opposite surface 218 to prevent the preformed solder body 300 from being separated from the contact terminal 202 prior to heating and reflowing the preformed solder body 300. In another embodiment where the fixation tabs 318 are located in the interior of the preformed solder bodies 300 and not along the outer edges 302-308 of the preformed solder bodies 300 and the fixation openings 220 are located in the interior of the contact terminals 202 between the edges 206, 208, 210, 214 (shown in FIG. 2), the fixation tabs 318 may be pushed through the fixation openings 220 in order to crimp the preformed solder bodies 300 onto the contact terminals 202. For example, an interior portion of the preformed solder bodies 300 may be crimped onto the contact terminals 202 through an interior window in the contact terminals 202. Alternatively, all or a portion of an outer perimeter of the preformed solder bodies 300 may be crimped onto the contact terminals 202. For example, the outer perimeter of the preformed solder bodies 300 along the edges 206, 208, 210 of the contact terminals 202 may be crimped onto the contact terminals 202.

Figure 6:
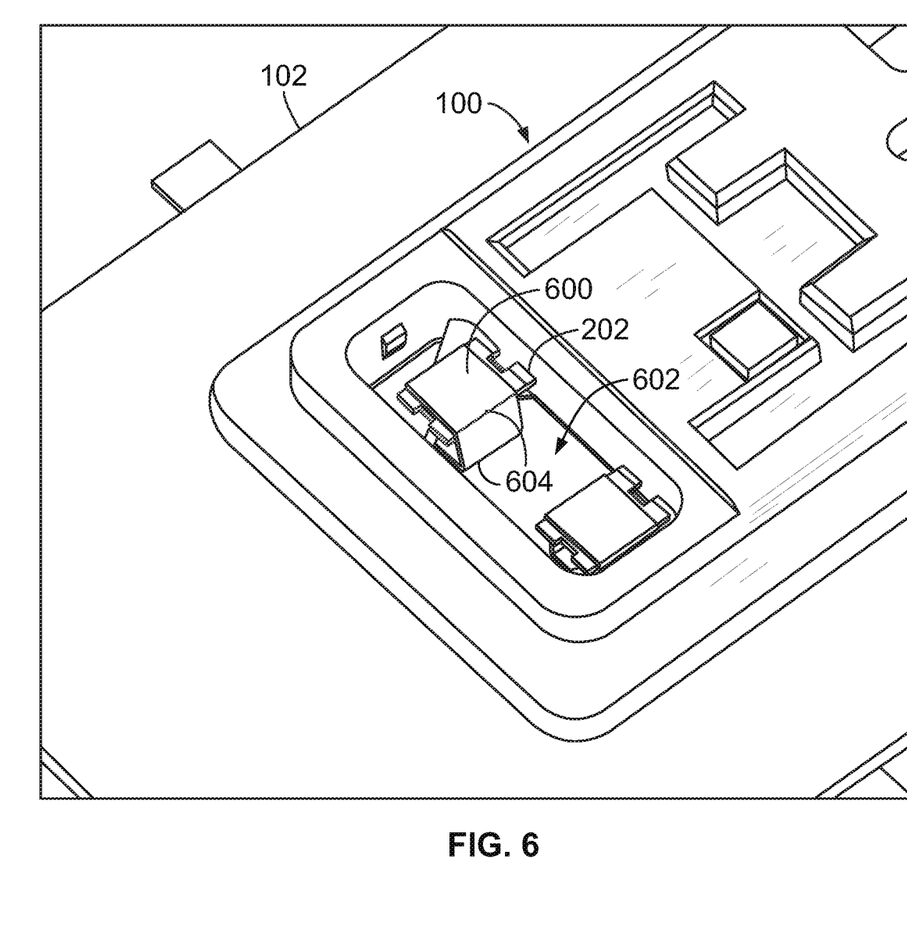
FIG. 6 is another partial perspective view of the connector shown in FIG. 1 in accordance with one embodiment of the presently described invention.

FIG. 6 is another partial perspective view of the connector 100 in accordance with one embodiment of the presently described invention. The photovoltaic module 102 includes the photovoltaic contact 600 that extends out of the photovoltaic module 102. The photovoltaic contact 600 protrudes out of the opening 602 in the photovoltaic module 102 and provides an electrically communicative path between the photovoltaic module 102 and the connector 100. In the illustrated embodiment, the photovoltaic contact 600 is a bus bar ribbon that is at least partially flexible. Alternatively, a different contact or electrically conductive component may be used to transmit electricity from the photovoltaic module 102 to the connector 100. The photovoltaic contacts 600 are applied to the preformed solder bodies 300 of the contact terminals 202 such that the preformed solder bodies 300 are disposed between the photovoltaic contacts 600 and the contact terminals 202. For example, several bends 604 may be provided in the photovoltaic contacts 600 to cause the contacts 600 to extend out of the photovoltaic module 102, up and over the contact terminals 202 and onto the preformed solder bodies 300.

Heat or thermal energy may be applied to the preformed solder bodies 300 to reflow the solder bodies 300 and to electrically and mechanically couple the photovoltaic contacts 600 to the contact terminals 202. For example, the solder bodies 300 may be heated to cause the solder bodies to reflow and wet both the contact terminals 202 and the photovoltaic contacts 600. In one embodiment, the solder bodies 300 may be heated in an automated process. For example, spring-loaded heating elements (not shown) may be lowered onto the photovoltaic contacts 600 to heat the solder bodies 300. After the source of heat is removed, the solder bodies 300 may solidify to secure the photovoltaic contacts 600 to the contact terminals 202 while also providing an electrically communicative pathway between the photovoltaic contacts 600 and the contact terminals 202. Electric current that is generated in the photovoltaic module 102 may then be conveyed to the connector 100 through the photovoltaic contacts 600, solder bodies 300 and contact terminals 202.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An electrical connector comprising:
a connector housing that is configured to be mounted to an exterior surface of a photovoltaic module;
a contact terminal joined to the connector housing, the contact terminal having a fixation opening that extends into the contact terminal such that the fixation opening penetrates a surface of the contact terminal; and
a preformed solder body including a fixation tab, the preformed solder body providing an electrically conductive connection between the contact terminal and a conductive contact extending out of the exterior surface of the photovoltaic module to electrically couple the contact terminal and the photovoltaic module, wherein the fixation tab of the preformed solder body extends into the fixation opening of the contact terminal to secure the preformed solder body to the contact terminal;
wherein the fixation tab of the preformed solder body is crimped to the contact terminal to secure the preformed solder body to the contact terminal prior to reflowing the preformed solder body.

2. The connector of claim 1, wherein the surface of the contact terminal is a connection surface, the preformed solder body being applied to the connection surface, wherein the connection surface of the contact terminal is a substantially planar surface and the preformed solder body is a substantially planar body.

3. The connector of claim 1, wherein the surface of the contact terminal is a connection surface, the preformed solder body being applied to the connection surface, wherein the preformed solder body extends over substantially all of the connection surface of the contact terminal.

4. The connector of claim 1, wherein the preformed solder body is disposed between the contact terminal and the conductive contact of the photovoltaic module.

5. The connector of claim 1, wherein the fixation tab comprises a portion of the preformed solder body that is bent out of a plane defined by the preformed solder body.

6. The connector of claim 1, wherein the fixation opening of the contact terminal is a slot extending into the contact terminal from a peripheral edge of the contact terminal.

7. The connector of claim 1, wherein the contact terminal includes a plurality of the fixation openings disposed along opposite outer edges of the contact terminal.

8. The connector of claim 1, wherein the contact terminal extends out of the connector housing along an extension direction and includes a plurality of the fixation openings linearly aligned with one another along the extension direction.

9. The connector of claim 1, wherein the surface of the contact terminal is a connection surface, the preformed solder body being applied to the connection surface, wherein the contact terminal includes an opposite surface disposed opposite of the connection surface, and further wherein the opposite surface opposes the exterior surface of the photovoltaic module.

10. The connector of claim 1, wherein the fixation opening of the contact terminal is disposed along an interface between the connector housing and the contact terminal.

11. The connector of claim 1, wherein the surface of the contact terminal is a first surface, the fixation opening extending into the contact terminal such that the fixation terminal penetrates the first surface, extends through a thickness of the contact terminal, and penetrates a second surface of the contact terminal that is opposite the first surface.

12. The connector of claim 1, wherein the surface of the contact terminal is substantially planar.

13. The connector of claim 1, wherein the fixation opening is not formed by a bend of the contact terminal.

14. An electrical connector comprising:
a connector housing that is configured to be mounted to an exterior surface of a photovoltaic module; and
a contact terminal joined to the connector housing, the contact terminal having a fixation opening that extends into the contact terminal such that the fixation opening penetrates a surface of the contact terminal, wherein a preformed solder body establishes an electrically conductive connection between the contact terminal and a conductive contact extending out of the photovoltaic module to electrically couple the contact terminal and the photovoltaic module, wherein the fixation opening receives a fixation tab of the preformed solder body into the fixation opening to secure the preformed solder body to the contact terminal;
wherein the surface of the contact terminal is a first surface, the fixation opening extending into the contact terminal such that the fixation terminal penetrates the first surface, extends through a thickness of the contact terminal, and penetrates a second surface of the contact terminal that is opposite the first surface.

15. The connector of claim 14, wherein the fixation opening of the contact terminal is a slot extending into the contact terminal from a peripheral edge of the contact terminal.

16. The connector of claim 14, wherein the contact terminal includes a plurality of the fixation openings disposed along opposite edges of the contact terminal.

17. The connector of claim 14, wherein the contact terminal extends out of the connector housing along an extension direction and includes a plurality of the fixation openings linearly aligned with one another in a direction that is angled with respect to the extension direction.

18. The connector of claim 14, wherein the surface of the contact terminal is a connection surface, the preformed solder body being applied to the connection surface, wherein the contact terminal includes an opposite surface disposed opposite of the connection surface, and further wherein the opposite surface opposes the exterior surface of the photovoltaic module.

19. The connector of claim 14, wherein the fixation opening of the contact terminal is disposed at an interface between the connector housing and the contact terminal.

20. The connector of claim 1, wherein the surface of the contact terminal is a connection surface, and wherein the preformed solder body is applied to the connection surface.

21. The connector of claim 14, wherein the surface of the contact terminal is a connection surface that receives the preformed solder body.

22. The connector of claim 14, wherein the fixation opening receives the fixation tab of the preformed solder body when the preformed soldered body is crimped to the contact terminal to secure the preformed solder body to the contact terminal.

* * * * *